United States Patent
Kameyama et al.

(10) Patent No.: US 8,203,772 B2
(45) Date of Patent: Jun. 19, 2012

(54) IMAGE OUTPUT METHOD, APPARATUS, AND PROGRAM USING ONE OR MORE ATTENTION LEVELS

(75) Inventors: Hirokazu Kameyama, Kanagawa-ken (JP); Fumito Takemoto, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1077 days.

(21) Appl. No.: 11/730,041

(22) Filed: Mar. 29, 2007

(65) Prior Publication Data
US 2007/0229693 A1   Oct. 4, 2007

(51) Int. Cl.
*G06K 9/46* (2006.01)
(52) U.S. Cl. ............ 358/538; 358/1.2; 358/1.9; 358/2.1; 358/528; 382/190; 382/165; 382/298; 382/282; 348/333.01
(58) Field of Classification Search .................. 358/1.2, 358/1.6, 1.9, 2.1, 527, 528; 348/333.01; 382/164, 165, 190, 282, 298
See application file for complete search history.

(56) References Cited

U.S. PATENT DOCUMENTS

| | | | |
|---|---|---|---|
| 6,556,721 B1 * | 4/2003 | Wang et al. | 382/282 |
| 6,597,428 B1 | 7/2003 | Adachi et al. | |
| 7,355,754 B2 * | 4/2008 | Terashita | 358/2.1 |
| 7,471,827 B2 * | 12/2008 | Xie et al. | 382/173 |

OTHER PUBLICATIONS

Li-Qun Chen, A visual attention model for adapting images on small displays, 2003, Multimedia Systems/Springer-Verlag, pp. 1-11.*

* cited by examiner

*Primary Examiner* — King Poon
*Assistant Examiner* — Jamares Q Washington
(74) *Attorney, Agent, or Firm* — Birch, Stewart, Kolasch & Birch, LLP (57) ABSTRACT

When a processed image obtained by performing image processing on an original image is presented, an option desired by a user is presented. A plurality of object regions is detected from an original image to detect the imaged state of each of the object regions when the original image was obtained. Then, an attention level for each object region is calculated based on the imaged state of the object region, and an output condition and an image processing condition are set based on the calculated attention level. Thereafter, a processed image is generated by performing image processing according to the image processing condition, and the processed image is outputted according to the output condition.

13 Claims, 7 Drawing Sheets

IMAGE OUTPUT METHOD, APPARATUS, AND PROGRAM USING ONE OR MORE ATTENTION LEVELS

BACKGROUND OF THE INVENTION

1. Field of the Invention

The present invention relates to an image output method and apparatus for outputting an original image, obtained by a user of a digital camera or the like using the digital camera, to a display or a printer, and a program therefor.

2. Description of the Related Art

When printing image data obtained by a user of a digital camera or the like using the digital camera, it is customary that the image data are processed using standard processing conditions that conform to the printer. But, a method in which image processing is performed by changing the image processing conditions from the standard processing conditions, including color tone, gradation, sharpness, and the like, and the processed results are provided to the user is proposed as described, for example, in U.S. Pat. No. 6,597,428. In the aforementioned patent publication, a standard color image obtained through a standard image processing, and a plurality of processed images obtained through various types of image processing different from the standard image processing are printed, for example, on a sheet of printing paper to provide the user with images processed differently.

The method described in the aforementioned patent publication, however, has a problem that a desirable printed output may not be obtained, since the processing conditions are fixed regardless of the type of imaged subject. That is, the method provides a plurality of images obtained through predetermined types of image processing, so that unnecessary images are also outputted when having the user makes a selection, thereby the image selection becomes complicated.

SUMMARY OF THE INVENTION

In view of the circumstances described above, it is an object of the present invention to provide an image processing method and apparatus capable of providing an option desired by a user when providing a processed image obtained by performing image processing on an original image to the user, and a program therefor.

An image output method of the present invention is a method for performing image processing on an original image and outputting a processed image; the method including the steps of:

generating a plurality of object regions by region dividing the original image with respect to each object;

calculating an attention level for each of the generated object regions based on an imaged state of each of the object regions;

determining an output condition for outputting the processed image based on the calculated attention level; and outputting the processed image using the determined output condition.

An image output apparatus of the present invention is an apparatus, including:

an image processing means for generating a processed image by performing image processing on an original image;

an object region generation means for generating a plurality of object regions by region dividing the original image with respect to each object;

an attention level calculation means for calculating an attention level for each of the object regions generated by the object region generation means based on an imaged state of each of the object regions;

a condition setting means for setting an output condition for outputting the processed image using the attention level calculated by the attention level calculation means; and an image output means for outputting the processed image using the output condition determined by the condition setting means.

A program of the present invention is a program for causing a computer to execute an image output method for performing image processing on an original image and outputting a processed image; the method including the steps of:

generating a plurality of object regions by region dividing the original image with respect to each object;

calculating an attention level for each of the generated object regions based on an imaged state of each of the object regions;

determining an output condition for outputting the processed image based on the calculated attention level; and outputting the processed image using the determined output condition.

Here, the referent of "object" as used herein means a subject in the original image, such as a person, the sky, the ocean, a tree, a building, or the like, and the referent of "object region" as used herein means a region occupied by the object within the original image. The referent of "imaged state" as used herein means an imaged state that indicates how the object region is recorded within the original image. The imaged state may be, for example, an image characteristic of the object region, such as brightness, color, hue, saturation, or the like, or an image structure of the object region, such as size, aspect ratio, edge information, texture information, contrast, or the like. Here, the attention level calculation means may include an attention level conversion table that indicates the relationship between the image characteristic or image structure and the attention level, and calculates the attention level from the image characteristic or image structure using the attention level conversion table. The referent of "attention level" as used herein means a degree of attention that might be paid by the photographer, and the attention level calculation means calculates the attention level on the assumption that the object region where the attention is paid by the photographer is recorded in good condition.

The condition setting means may have a function to set a processing condition in the image processing means, as well as the output condition.

Further, the image output means may be a means for outputting only the processed image, or a means for outputting a standard processed image obtained by performing standard image processing on the original image, in addition to the processed image. The referent of "standard processed image" as used herein means is an image obtained, for example, by adjusting the aspect ratio of the original image according to the output format of the display device or printer device, or by performing sharpness processing, and the like on the original image so that an optimum image is obtained with respect to the output characteristics of the display device or printer device.

The image processing means may be a means that performs any type of image processing. For example, it may be a means for generating a trimmed image by setting a trimming frame on the original image. Here, the image processing means may use any method as long as it is capable of setting the trimming frame adjusted to an object region using the attention level. For example, the trimming frame may be set so as to include an object region having an attention level greater than a predetermined setting threshold value, or it may be set so as to be adjusted to an object region having a highest attention level among the object regions included in the original image.

Note that an object discrimination means for discriminating a type of the object region may further be included. The referent of "discriminating a type of the object region" as used herein means discriminating the object region as, for example, a mountain, a sea, a flower, a person, a human face, or the like. Here, the attention level calculation means may have a function to calculate the attention level from the type of the object region discriminated by the object discrimination means.

Further, the original image may be an image obtained by imaging using an imaging device. Here, an imaged condition obtaining means for obtaining an imaged condition of the original image when the image was obtained may further be included. The imaged condition may be any information related to imaged conditions when the original image was obtained using an imaging device. For example, the imaged condition may be imaging mode, aperture value, zoom, with or without flash, shutter speed, location of imaging, data and time of imaging, or the like. In this case, the attention level calculation means may be a means for calculating the attention level of the object region using the imaged condition obtained by the imaged condition obtaining means.

According to the image output apparatus and program of the present invention, in image output method for performing image processing on an original image and outputting a processed image, a plurality of object regions is generated by region dividing the original image with respect to each object; an attention level for each of the generated object regions is calculated based on an imaged state of each of the object regions; an output condition for outputting the processed image is determined based on the calculated attention level; and the processed image is outputted using the determined output condition. In this way, the output condition is set by estimating to which object the photographer's attention was directed when the original image was obtained by imaging based on the imaged state of the object region, so that an option of the processed image desired by the user may be presented.

Further, if the condition setting means is a means for setting the image size of the processed image as the output condition, the processed image having a great attention level may be set to a large size, so that an option of the processed image desired by the user may be presented without the image size of the processed image being too large or too small.

If the condition setting means is a means for setting a number of the processed images to be generated as the output condition, options of the processed image desired by the user may be presented without a too large or small number of processed images is presented.

Further, if the recommendation level calculation means is further included, and the image output means is a means for outputting the processed image having a display size proportional to the magnitude of the recommendation level calculated by the recommendation level calculation means, the processed image having a great recommendation level may be found easily by the user, which may facilitate the user selection.

Still further, if the image processing means is a means for determining the image processing condition using the attention level, and performing image processing on the original image based on the determined image processing condition, then, for example, image processing for highlighting an object region having a great attention level may be performed, so that a high quality processed image may be presented.

Further, if the image output means is a means for outputting the standard processed image, in addition to the processed image, user may perform image selection by comparing the standard processed image with the processed image, which may facilitate the user selection for the processed image.

Still further, if the image processing means is a means for generating a trimmed image by performing trimming on an original image, and the condition setting means is a means for setting a trimming condition that causes the trimming to be adjusted to an object region having a highest attention level, trimming that reflects the intention of the photographer may be performed.

Further, if the object discrimination means for discriminating a type of the object region is further included, and if the attention level calculation means has a function to calculate the attention level from the type of an object region, then if, for example, the type of the object region is a human face, processing in which the attention level is set high, or the like may be performed, so that an attention level reflecting the intention of the photographer may be calculated, and reliability for composition evaluation may be improved.

Still further, if the imaged condition obtaining means 25 for obtaining an imaged condition of an original image when the image was obtained is further included, and the attention level calculation means has a function to calculate the attention level of the object region using the imaged condition obtained by the imaged condition obtaining means, the photographer's intention of how the image was to be recorded may be recognized from the imaged condition, and the photographer's intention may be reflected to the attention level, so that an attention level reflecting the photographer's intention may be calculated, and reliability of composition evaluation may be improved.

DESCRIPTION OF THE PREFERRED EMBODIMENTS

Hereinafter, an exemplary embodiment of an image output apparatus of the present invention will be described in detail with reference to the accompanying drawings. The configuration of the image output apparatus 1 shown in FIG. 1 may be realized by executing an image output program, read into an auxiliary storage device, on a computer (e.g., personal computer, or the like). Here, the image output program is stored in an information storage medium, such as a CD-ROM or the like, or distributed through a network, such as the Internet, and installed on the computer.

Figure 1:
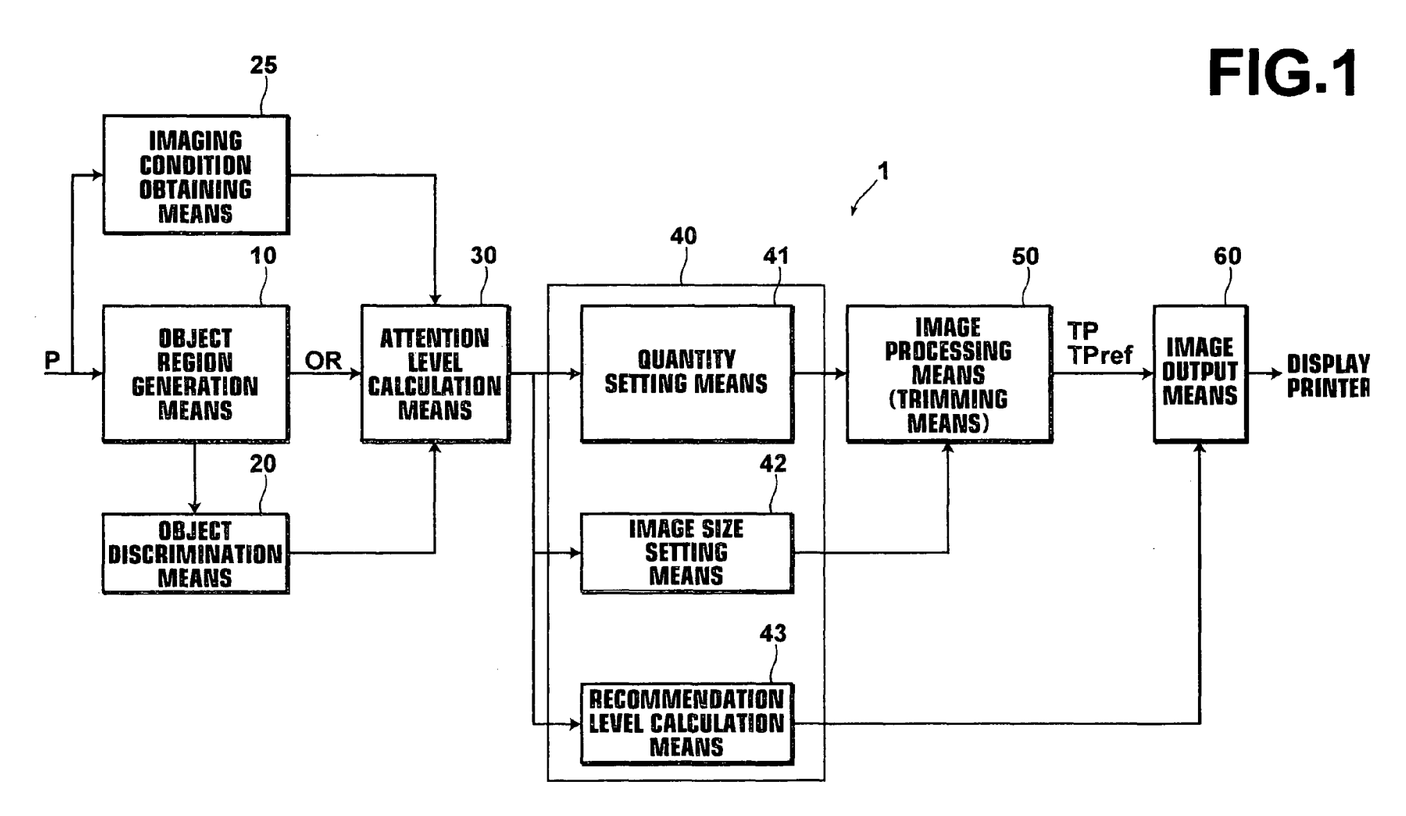
FIG. 1 is a block diagram of an exemplary embodiment of the image output apparatus of the present invention.

The image output apparatus 1 shown in FIG. 1 is an apparatus for performing image processing on an original image P obtained by a digital camera or the like, and outputting a processed image TP to a display device or a printer device. The apparatus includes: an object region generation means 10 for generating a plurality of object regions OR by region dividing the original image P with respect to each object; an attention level calculation means 30 for calculating an attention level Tt of each generated object region OR based on an imaged state of the object region; a condition setting means 40 for setting an output condition for outputting a processed image TP based on the calculated attention level Tt; an image processing means 50 for generating a processed image by performing image processing on the original image P; and an image output means 60 for outputting the processed image TP using the output condition determined by the condition setting means 40.

Figure 2A:
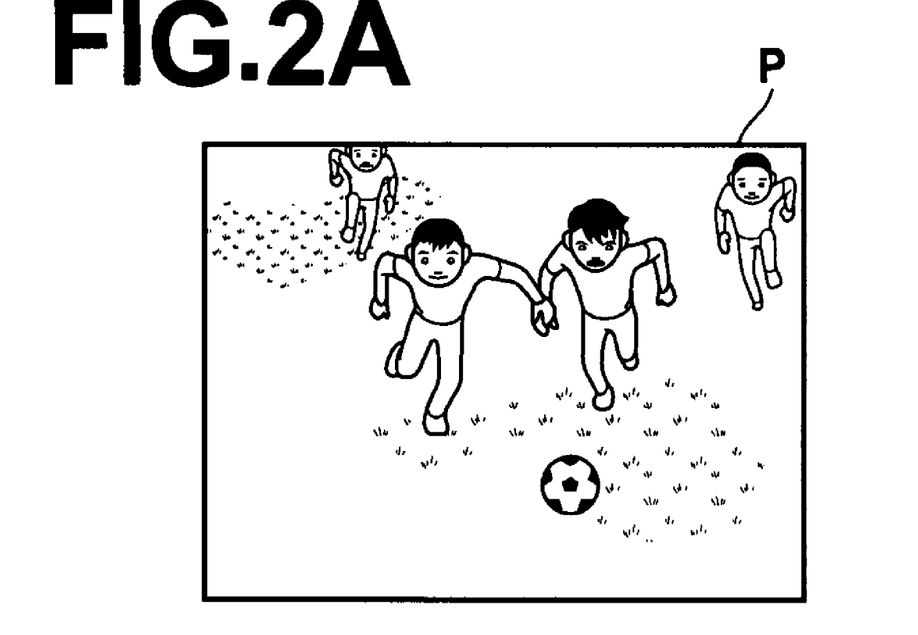
FIGS. 2A and 2B are schematic diagrams illustrating an example original image processed by the image output apparatus shown in FIG. 1.
Figure 2B:
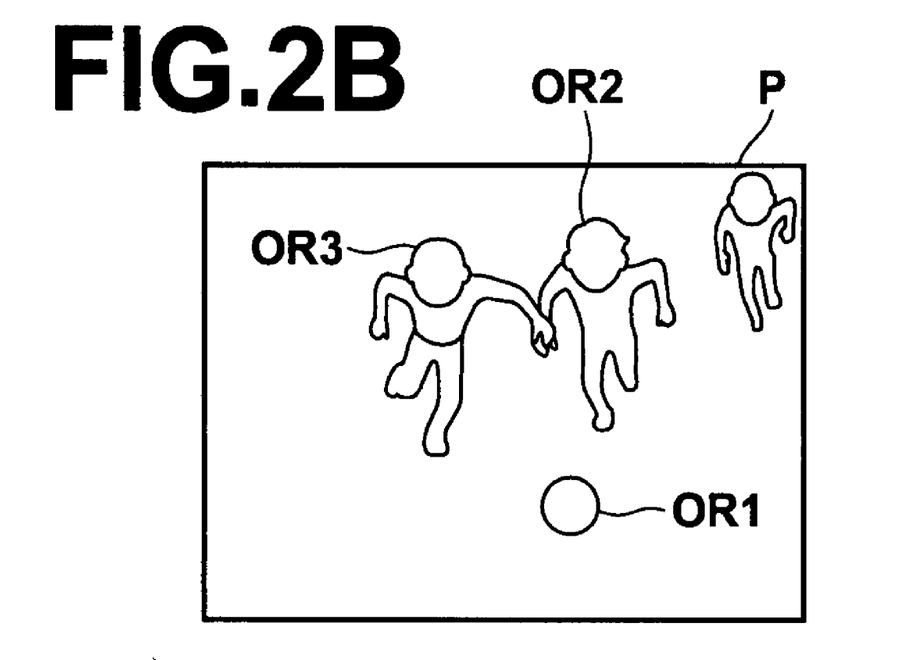

When objects such as persons and faces thereof, buildings, plants, and the like are imaged, as illustrated in FIG. 2A, the object region generation means 10 generates an object region occupied by each object in the original image P, as shown in FIG. 2B. The object region generation means 10 generates a plurality of object regions OR using, for example, a method described in Japanese Unexamined Patent Publication No. 2005-63308. More specifically, each object region OR is generated by extracting a plurality of characteristic amounts from each pixel of the original image P, clustering (classifying) each pixel using the extracted characteristic amounts, generating clustered regions by performing region dividing with respect to each group of classified pixels, and integrating the generated clustered regions based on the size thereof. The object region generation means 10 may use any type of known techniques including a method for detecting the object region OR through edge detection and the like, other than the method described above.

The image output apparatus 1 further includes an object discrimination means 20 for discriminating a type of an object region OR generated by the object region generation means 10. The object discrimination means 20 discriminates the type of each object region OR using, for example, a method that employs the self-organizing map described in Japanese Unexamined Patent Publication No. 2005-63308. More specifically, the object discrimination means 20 divides an original image P into a plurality of block regions, each having a specified number of pixels, then extracts a characteristic amount from each block region, generates a characteristic vector based on the extracted characteristic amount, and inputs the generated characteristic vector to a self-organizing map to discriminate the type of each block region. Thereafter, it calculates the block region discrimination results with respect to each object region OR, and discriminates a type having the largest number as the type of the object region OR.

The attention level calculation means 30 is a means for calculating an attention level Tt of an object region OR generated by the object region generation means 10. Here, as the imaged state of the object region OR, an image characteristic of the object region, such as the brightness, hue, saturation, or the like, or an image structure of the object region, such as the size, aspect ratio, edge information, texture information, contrast, or the like may be used.

Figure 3A:
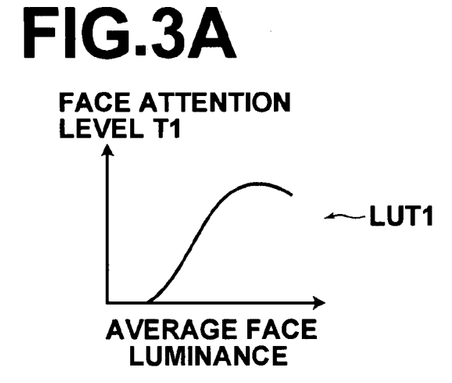
FIGS. 3A and 3B are graphs illustrating example attention level conversion tables stored in the attention level calculation means shown in FIG. 1.
Figure 3B:
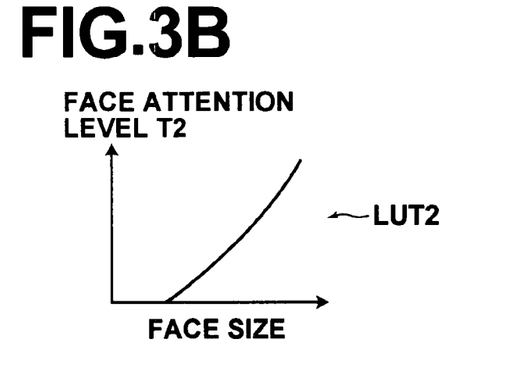

For example, if the average value of luminance and the size (area) of an object region OR is used as the imaged state of the object region OR, for example, an attention level conversion table LUT1, shown in FIG. 3A, that indicates the relationship between the average value of luminance of the object region OR and attention level T1, and an attention level conversion table LUT2, shown in FIG. 3B, that indicates the relationship between the size of the object region OR and attention level T2 are stored in the attention level calculation means 30 in advance. Then, the attention level calculation means 30 obtains the average value of luminance and size of each object region OR, and calculates the attention levels T1 and T2 from the attention level conversion tables LUT1 and LUT2 respectively. Thereafter, it calculates the final attention level Tt of the object region OR, ($Tt = a \times T1 + b \times T2$, a, and b are weighting factors).

Further, the attention level calculation means 30 has a function to calculate the attention level Tt using even a type of an object region OR discriminated by the object discrimination means 20. The object discrimination means 20 discriminates a type of each object region OR using, for example, a method that employs the self-organizing map described in Japanese Unexamined Patent Publication No. 2005-63308. More specifically, the object discrimination means 20 divides the original image P into a plurality of block regions, each having a specified number of pixels, then extracts a characteristic amount from each block region, generates a characteristic vector based on the extracted characteristic amount, and inputs the generated characteristic vector to a self-organizing map to discriminate the type of each block region. Thereafter, it calculates the block region discrimination results with respect to each object region OR, and discriminates a type having the largest number as the type of the object region OR. For example, the attention level calculation means 30 is configured so as to calculate the attention level Tt higher for an object region OR discriminated as a person. In FIG. 2, the attention levels Tt for the object regions OR2, OR3 are greater than that of the object region OR1 discriminated as a spherical object. In this way, an attention level Tt reflecting the photographer's intention, i.e., the object to which the attention of the photographer is directed, may be calculated.

Still further, the attention level calculation means 30 has a function to calculate the attention level Tt based on the imaged condition obtained by the imaged condition obtaining means 25. The imaged condition obtaining means 25 obtains an imaged condition included in tag information of the original image P. The imaged condition may be, for example, imaging mode (portrait mode, landscape mode, sport mode, or the like), aperture value, zoom, with or without flash, shutter speed, location of imaging, data and time of imaging, or the like. For example, if the imaging mode is portrait, the attention level calculation means 30 calculates the attention level Tt high for an object region OR whose type is discriminated as a face and body of a person. Alternatively, if the aperture is full open with a high shutter speed, the attention level calculation means 30 may calculate the attention levels of a focused object region OR and an object region OR of distant landscape high. In this way, how the image was recorded by the photographer may be recognized from the imaged condition, and the recognized results may be reflected to the attention level Tt.

The condition setting means 40 shown in FIG. 1 is a means for setting an image processing condition in the image processing means 50, and an output condition for outputting the image from the image output means 60 using the attention level Tt. More specifically, the condition setting means 40 includes: a quantity setting means 41 for setting a number of the processed images TP in the image processing means 50; an image size setting means 42 for setting the image size of the processed image TP; and a recommendation level calculation means 43.

The quantity setting means 41 is a means for setting a number of the processed images TP to be outputted from the image output means 60 as the output condition thereof, and a number of images to be generated in the image processing means 50 as the processing condition. It sets these numbers using the attention level Tt of each subject S in the original image P. More specifically, assuming a case in which three object regions OR1 to OR3 are detected as illustrated in FIG. 2B, and the attention level of the OR1 (spherical object 1) is 40, the attention level of the OR2 (person 1) is 80, and the attention level of the OR3 (person 2) is 100. Here, the quantity setting means 41 detects each object region OR having an attention level greater than a predetermined setting threshold value Ttref (e.g., 60), and sets the detected number to the number of processed images TP to be outputted (to be generated). In FIG. 2B, the two object regions OR2 and OR3 have greater attention levels than the setting threshold value Ttref, so that the number of processed images TP is set to 2.

Alternatively, a configuration may be adopted in which a combination of two object regions OR whose average value of the attention levels is greater than a predetermined setting threshold value Ttref10, and detected number of combinations is set to the number of processed image TP to be outputted. Further, another configuration may adopted in which, when "n" object regions OR are detected in an original image P, the attention levels are added up and averaged in descending order, like obtaining an average value of two highest attention levels, an average value of three highest attention levels, - - -, and an average value of "n" object regions. Then, the number of average values of a plurality of attention levels greater than the setting threshold value Ttref10 is set as the number of processed images TP.

Figure 4:
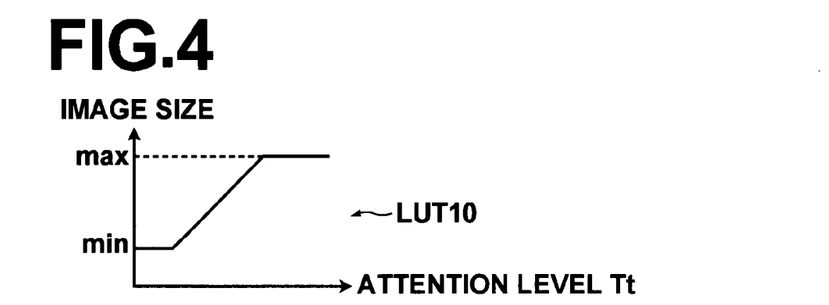
FIG. 4 is a graph illustrating an example attention level conversion table stored in the image size calculation means shown in FIG. 1.

The image size setting means 42 includes a conversion table LUT10 for determining the image size as the processing condition for the processed image TP to be generated in the image processing means 50 from, for example, the attention level Tt shown in FIG. 4, and sets the image size of the processed image TP according to the attention level Tt. Here, the attention level Tt used for determining the image size is the average value of the attention levels Tt of the object regions OR serving as the reference for setting a trimming frame TG in the image processing means (trimming means) 50, described later.

Figure 5:
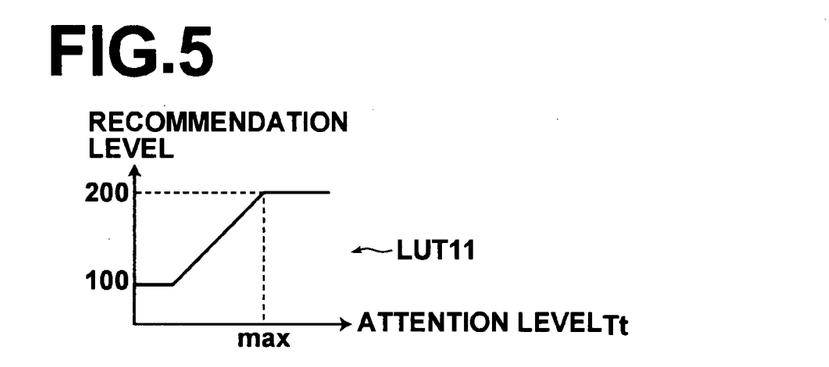
FIG. 5 is a graph illustrating an example conversion table stored in the recommendation level calculation means shown in FIG. 1.

The recommendation level calculation means 43 calculates a recommendation level, provided to the user, of the processed image TP, and includes a conversion table LUT11 for converting the attention level Tt like that shown in FIG. 5 to the recommendation level. Here, the attention level Tt used for determining the recommendation level is the average value of the attention levels Tt of the object regions OR serving as the reference for setting the trimming frame TG in the image processing means (trimming means) 50, described later.

The image processing means 50 performs image processing on the original image P based on the attention level Tt. For example, it has a function to set a trimming frame and to generate a trimmed image TP. Here, the image processing means 50 may set the trimming frame TG in various ways. For example, a predetermined area obtained by extending a rectangle surrounding an object region OR having a highest attention level Tt among a plurality of object regions OR may be set as the trimming frame TG. Alternatively, the trimming frame TG may be set using any of known techniques, including what is known as a three-way division method in which the trimming frame TG is set with reference to an object region OR having a highest attention level Tt, and the like. Further, the trimming frame TG may be set so as to enclose an object region OR having an attention level Tt greater than a setting threshold value.

Figure 6A:
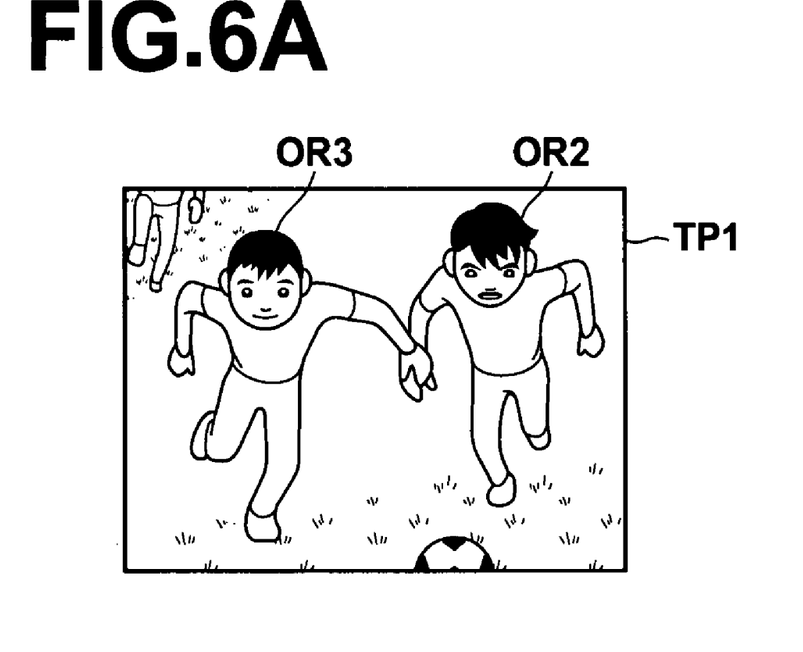
FIGS. 6A and 6B are schematic views illustrating example trimmed images generated by the image processing means shown in FIG. 1.
Figure 6B:
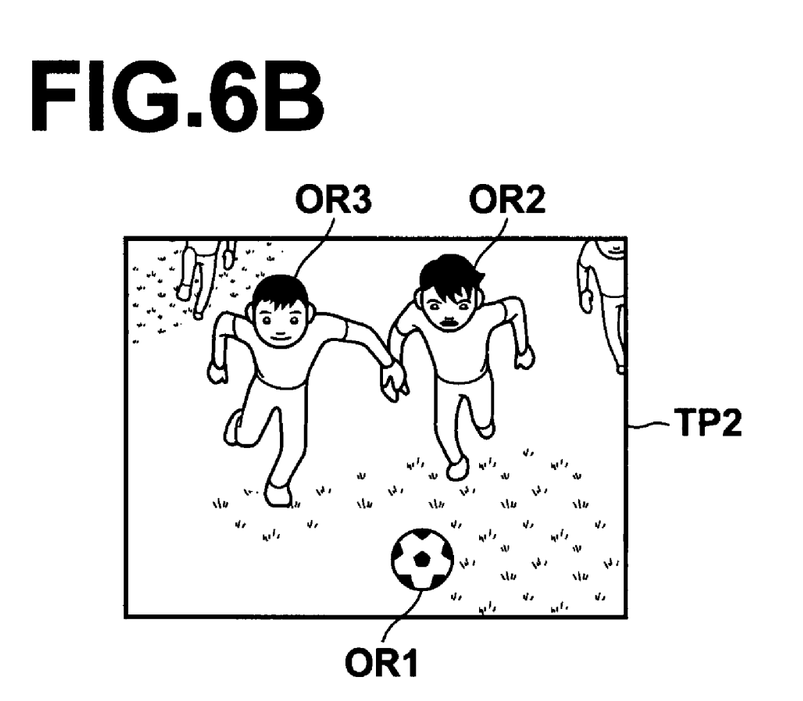

Here, the image processing means 50 generates a number of processed images TP corresponding to the number set by the quantity setting means 41. For example, if the number is set so that two processed images are generated for the original image P as illustrated in FIG. 2A, the image processing means 50 generates two processed images TP1 and TP2 under different image processing conditions (trimming conditions). More specifically, the image processing means 50 generates the trimmed image TP1 adjusted to the object region OR3 (person 3) as illustrated in FIG. 6A, and the trimmed image TP2 adjusted to the object regions OR2, OR3 (persons 2, 3) as illustrated in FIG. 6B. Here, the image processing means 50 generates the processed images TP1 and TP2 having a size corresponding to the image size set by the image size setting means 42. Further, the image processing means 50 has a function to generate a standard processed image TPref by performing optimum image processing on the original image P according to the display capabilities of the display, output capabilities of the printer, and the like, as well as generating the processed images TP1, TP2.

Figure 7:
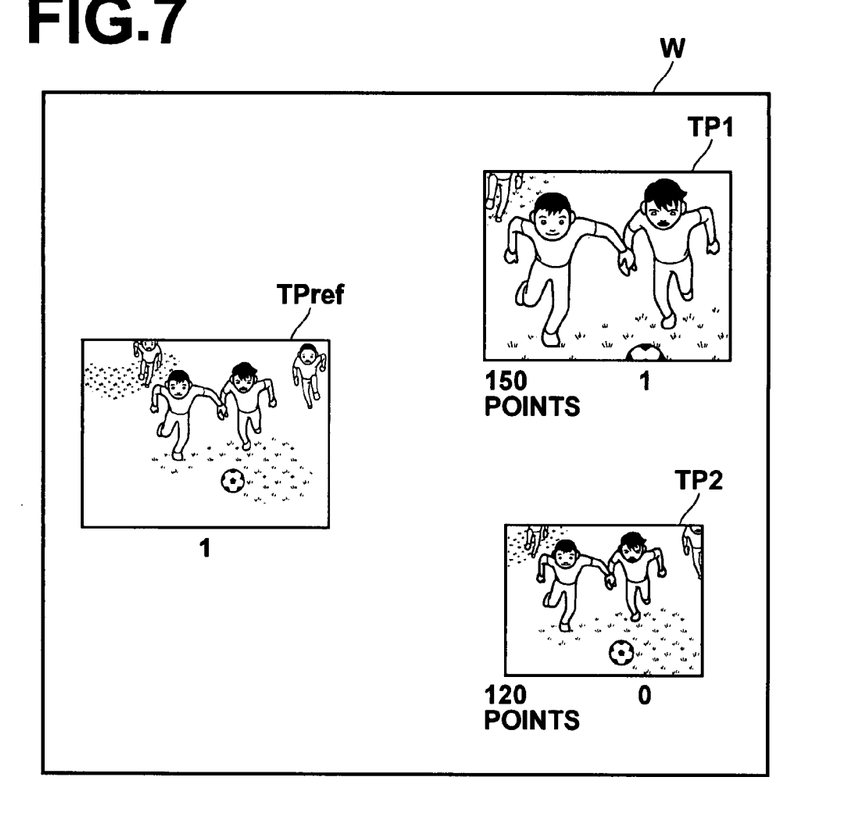
FIG. 7 is a schematic view illustrating an example display format of a processed image outputted from the image output means shown in FIG. 1.

The image output means 60 displays the processed image TP and standard processed image TPref, generated by the image processing means 50, for example, on a window screen W of the display as illustrated in FIG. 7. In FIG. 7, the image output means 60 displays the standard processed image TPref on the left within the window screen W, and a plurality of processed images TP1, TP2 on the right arranged vertically within the window screen W. Here, image output means 60 displays a number of prints below each of the images TPref, TP1, and TP2, and recommendation levels, calculated by the recommendation level calculation means 43, on the left below the images TP1 and TP2. Further, the image output means 60 displays the processed images TP1 and TP2 in descending order of recommendation level from the top, and such that the greater the recommendation level, the greater the size. This allows the user to know which of the processed images TP1 or TP2 is recommended at a glance, so that the time and effort for searching for a desirable processed image among a plurality of processed images TP may be saved.

Figure 8:
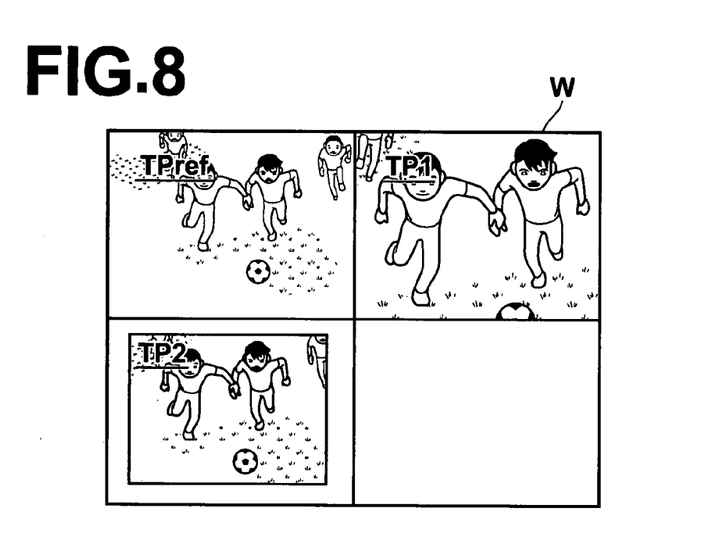
FIG. 8 is a schematic view illustrating another example display format of a processed image outputted from the image output means shown in FIG. 1.

Note that the display format of the processed images TP1 and TP2 is not limited to that shown in FIG. 7, and they may be displayed by dividing the screen as shown in FIG. 8. In this case also, the images are displayed such that the greater the recommendation level, the greater the size.

Figure 9:
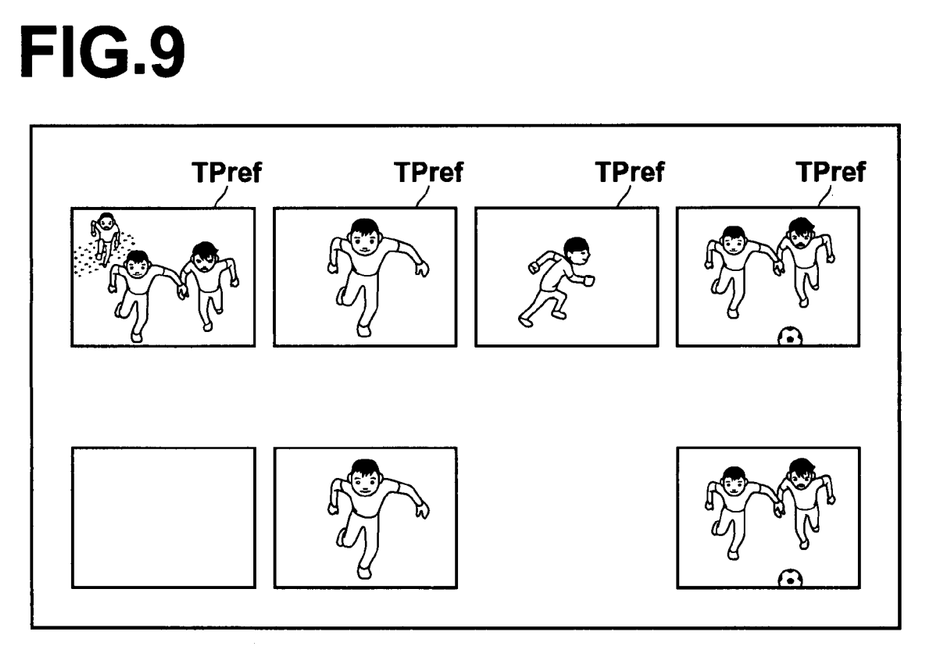
FIG. 9 is a schematic view illustrating still another example display format of a processed image outputted from the image output means shown in FIG. 1.

Further, if the image output means 60 is a means for outputting an image to a printer device, it may output an index print on which a plurality of standard processed images TPref and processed images TP are printed, as illustrated in FIG. 9.

In FIG. 9, a plurality of standard processed images TPref is disposed on the upper side, and processed images on the lower side, each corresponding to each standard processed image TPref on the upper side. In this case also, images are displayed such that the greater the recommendation level, the greater the size.

As described above, a processed image TP desired by a user may be estimated, and the processed image to be provided to the user may be automatically selected by calculating the attention level Tt from the imaged state of the object region OR, and setting an output condition for processed images TP1, TP2 using the attention level Tt. This allows an effective selection of a processed image for printing or storage. That is, if a plurality of processed images is generated using a plurality of predetermined image processing conditions as in the conventional way, a great many processed images are generated other than a processed image desired by a user, and it has been troublesome work to search for a desired processed image from among them. On the other hand, in the image output apparatus 1, the output condition and processing condition are set using the attention level Tt that indicates a degree of attention that might be paid by the photographer, so that only a processed image which is likely to be desired by the user may be presented as the processed image TP. Therefore, selection of a processed image for printing or storage may be performed efficiently.

Figure 10:
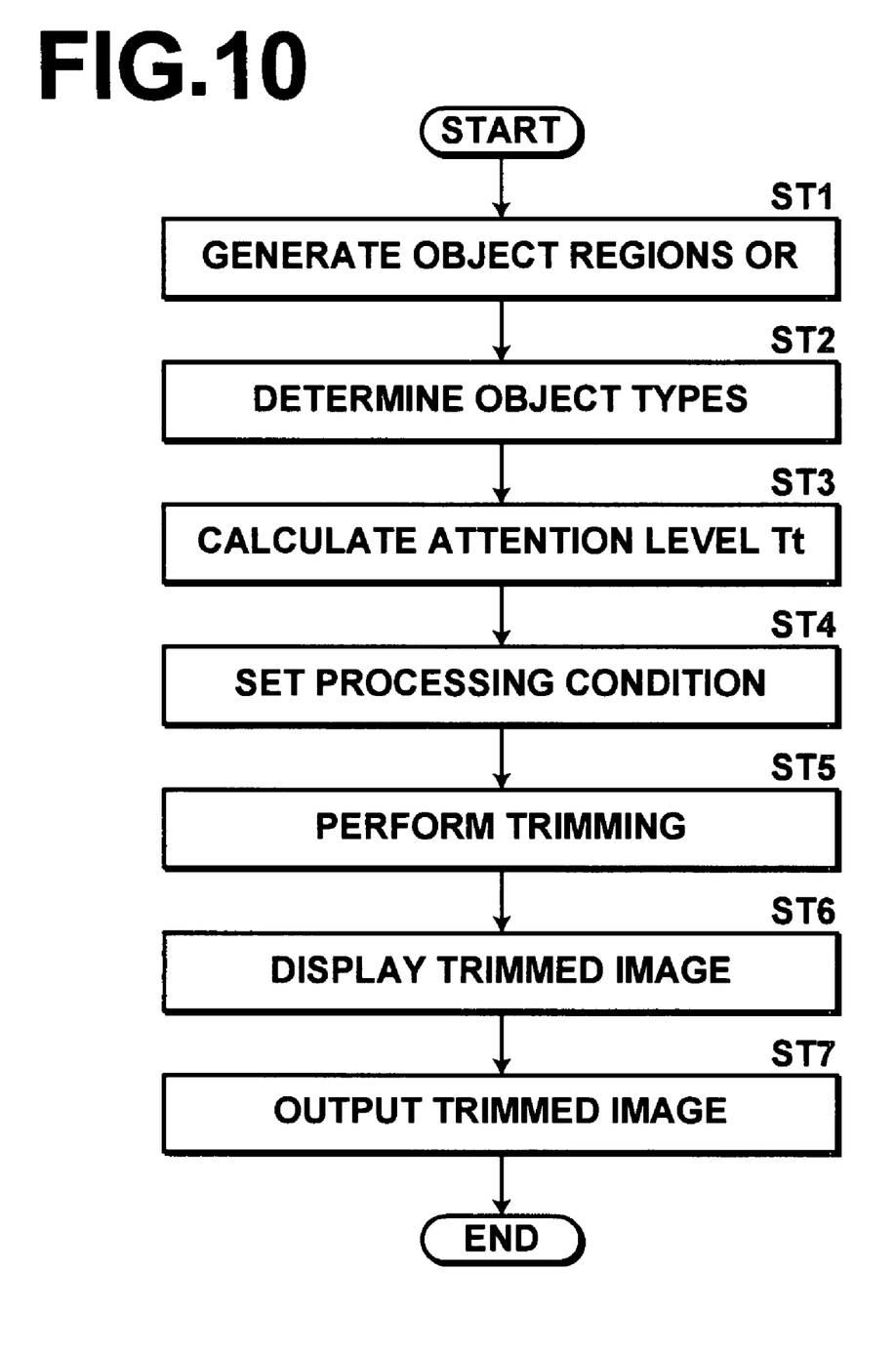
FIG. 10 is a flowchart illustrating an exemplary embodiment of the image output method of the present invention.

FIG. 10 is a flowchart illustrating an exemplary embodiment of the image output method of the present invention. The embodiment of the image output method will now be described with reference to FIGS. 1 to 10. First, a plurality of object regions OR is detected from an original image P in the object region generation means 10 (step ST1, FIG. 2). Thereafter, types of the detected object regions OR are determined, and the imaged state of the object regions OR when the original image P was obtained is detected (step ST2). Then, in the attention level calculation means 30, the attention level Tt of each of the object regions OR is calculated based on the imaged state and type thereof (step ST3). In the condition setting means 40, an output condition and a processing condition are set based on the calculated attention level Tt (step ST5, FIG. 6). Thereafter, in the image processing means 50, image processing is performed according to the processing condition and a processed image TP is generated (step ST5, FIG. 6). Then, the processed image TP is outputted from the image output means 60 according to the output conditions (steps ST6, ST7, FIGS. 7 to 9).

According to the embodiment described above, the output condition for the processed image TP is set by estimating to which object the attention of the photographer was directed when the original image was obtained through imaging based on the imaged state of the object regions OR, so that an option of the processed image TP desired by the user may be presented.

Further, if the condition setting means 40 is a means for setting the image size of the processed image as the output condition, the processed image TP having a great attention level Tt may be set to a large size, so that an option of the processed image TP desired by the user may be presented without the image size of the processed image TP being too large or too small.

If the condition setting means 40 is a means for setting a number of the processed images TP to be generated as the output condition, options of the processed images TP desired by the user may be presented without a too large or small number of processed images is presented.

Further, if the recommendation level calculation means 43 is further included, and the image output means 60 is a means for outputting the processed image having a display size proportional to the magnitude of the recommendation level calculated by the recommendation level calculation means 43, the processed image having a great recommendation level may be found easily by the user, which may facilitate the user selection.

Still further, if the image processing means 50 is a means for determining an image processing condition using the attention level Tt, and performing image processing on the original image P based on the determined image processing condition, then, for example, image processing for highlighting an object region OR having a great attention level may be performed, so that a high quality processed image TP may be presented.

Further, if the image output means 60 is a means for outputting the standard processed image TPref, in addition to the processed image TP, user may perform image selection by comparing the standard processed image TPref with the processed image TP, which may facilitate the user selection for the processed image.

Still further, if the image processing means 50 is a means for generating a trimmed image TP by performing trimming on an original image P, and the condition setting means 40 is a means for setting a trimming condition that causes the trimming to be adjusted to an object region having a highest attention level, trimming that reflects the intention of the photographer may be performed.

Further, if the object discrimination means 20 for discriminating a type of the object region OR is further included, and if the attention level calculation means 30 has a function to calculate the attention level Tt from the type of an object region OR, then if, for example, the type of the object region OR is a human face, processing in which the attention level is set high or the like may be performed, so that an attention level reflecting the intention of the photographer may be calculated, and reliability for composition evaluation may be improved.

Still further, if the imaged condition obtaining means 25 for obtaining an imaged condition of the original image P when the image was obtained is further included, and the attention level calculation means 30 has a function to calculate the attention level Tt of the object region OR using the imaged condition obtained by the imaged condition obtaining means 25, the photographer's intention of how the image was to be recorded may be recognized from the imaged condition, and the photographer's intention may be reflected to the attention level, so that an attention level reflecting the photographer's intention may be calculated, and reliability of composition evaluation may be improved.

It will be appreciated that the present is not limited to the embodiments described above. For example, in the embodiments described above, the description has been made of a case in which the image processing means 50 performs trimming, but it may be a means for performing color gradation processing, noise removing, sharpness processing, or the like. If the image processing means 50 performs sharpness processing, the image processing condition may be set such that the higher the attention level Tt, the sharper the processed image.

Further, in view of a version change of the trimming software, information related to the trimming may be added to the tag information of the processed image TP. Further, the results of recommended trimming selected by the customers in the past may be categorized, for example, with respect to each customer or landscape, and fed back for the calculation of the attention level.

What is claimed is:

1. An image output method for performing image processing including trimming processing on an original image, and outputting a processed image; the method comprising the steps of:
generating a plurality of object regions by region dividing the original image with respect to each object;
dividing the original image into a plurality of block regions, each having a specified number of pixels:
extracting a characteristic amount from each block region;
generating a characteristic vector based on the extracted characteristic amount:
inputting the generated characteristic vector to a self-organizing map to discriminate the type of each block region:
calculating the block region discrimination results with respect to each object region;
discriminating a type having a largest number as the type of the object region;
calculating an attention level for each of the generated object regions based on an imaged state of each of the object regions,
wherein said calculating an attention level is based on the discriminated type of the object region;
calculating an average value of one or more of the calculated attention levels for each of the object regions;
setting the number of at least one processed image to be generated as an output condition using the calculated average value; and
outputting the at least one processed image, the number of which has been set in said setting step, using the determined output condition, the at least one processed image being generated by trimming the original image in such a manner to include at least one of the plurality of object regions,
wherein said calculating an average value includes extracting the attention levels of i (i=2 to n) of n of the object regions in descending order, and calculating the average value of the i attention levels, and
said setting the number includes setting the number of average attention levels which are greater than a set threshold value from among the n−1 average attention levels as the number of at least one processed images.

2. An image output apparatus, comprising:
an image processing unit for generating a processed image by performing image processing including trimming processing on an original image;
an object region generation unit for generating a plurality of object regions by region dividing the original image with respect to each object;
an object discrimination unit for
dividing the original image into a plurality of block regions, each having a specified number of pixels,
extracting a characteristic amount from each block region,
generating a characteristic vector based on the extracted characteristic amount,
inputting the generated characteristic vector to a self-organizing map to discriminate the type of each block region,
calculating the block region discrimination results with respect to each object region, and
discriminating a type having a largest number as the type of the object region;
an attention level calculation unit for calculating an attention level for each of the object regions generated by the object region generation unit based on an imaged state of each of the object regions,
wherein said attention level calculation unit calculates an attention level based on the discriminated type of the object region:
a condition setting unit for calculating an average value of one or more attention levels calculated by the attention level calculation unit for each of the object regions, and setting the number of at least one processed image to be generated as an output condition using the calculated average value; and
an image output unit for outputting the at least one processed image, the number of which has been set by the condition setting unit, using the output condition determined by the condition setting unit, the at least one processed image being generated by trimming the original image in such a manner to include at least one of the plurality of object regions,
wherein the condition setting unit extracts the attention levels of i (i=2 to n) of n of the object regions in descending order, calculates the average value of the i attention levels, and sets the number of average attention levels which are greater than a set threshold value from among the n−1 average attention levels as the number of at least one processed images.

3. The image output apparatus according to claim 2, wherein the condition setting unit has a function to set a processing condition in the image processing unit using the attention level.

4. The image output apparatus according to claim 3, wherein the condition setting unit has a function to set an image size of the processed image as the processing condition.

5. The image output apparatus according to claim 2, wherein the condition setting unit calculates a recommendation level for the processed image using the attention level, and sets an output size of the processed image using the calculated recommendation level.

6. The image output apparatus according to claim 2, wherein the image output unit outputs a standard processed image obtained by performing standard image processing on the original image, in addition to the processed image.

7. The image output apparatus according to claim 2, wherein:
the image processing unit generates a trimmed image by performing trimming on the original image; and
the condition setting unit sets a trimming condition that causes the trimming to be adjusted to an object region having a highest attention level within the original image.

8. The image output apparatus according to claim 2, wherein:
the imaged state of the object region is an image characteristic or an image structure; and
the attention level calculation unit includes an attention level conversion table that indicates the relationship between the image characteristic or image structure and the attention level, and calculates the attention level from the image characteristic or image structure using the attention level conversion table.

9. The image output apparatus according to claim 2, wherein:
the apparatus further includes an object discrimination unit for discriminating a type of the object region; and
the attention level calculation unit has a function to calculate the attention level from the type of the object region.

10. The image output apparatus according to claim 2, wherein:

the original image is an image obtained by imaging using an imaging device;

the apparatus further includes an imaged condition obtaining unit for obtaining an imaged condition of the original image when the image was obtained; and the attention level calculation unit has a function to calculate the attention level of the object region using the imaged condition obtained by the imaged condition obtaining unit, wherein the imaged condition is one of a photography mode, aperture, zoom, use of flash, shutter speed, photography location, and photography time when photography was performed with a digital camera which includes said imaging device.

11. A program stored on a non-transitory information storage medium for causing a computer to execute an image output method for performing image processing including trimming processing on an original image and outputting a processed image: the method comprising the steps of:

generating a plurality of object regions by region dividing the original image with respect to each object;

dividing the original image into a plurality of block regions, each having a specified number of pixels:

extracting a characteristic amount from each block region;

generating a characteristic vector based on the extracted characteristic amount;

inputting the generated characteristic vector to a self-organizing map to discriminate the type of each block region;

calculating the block region discrimination results with respect to each object region:

discriminating a type having a largest number as the type of the object region:

calculating an attention level for each of the generated object regions based on an imaged state of each of the object regions, wherein said calculating an attention level is based on the discriminated type of the object region;

calculating an average value of one or more of the calculated attention levels for each of the object regions;

setting the number of at least one processed image to be generated as an output condition using the calculated average value; and outputting the at least one processed image, the number of which has been set in said setting step, using the determined output condition, the at least one processed image being generated by trimming the original image in such a manner to include at least one of the plurality of object regions, wherein said calculating an average value includes extracting the attention levels of i (i=2 to n) of n of the object regions in descending order, and calculating the average value of the i attention levels, and said setting the number includes setting the number of average attention levels which are greater than a set threshold value from among the n−1 average attention levels as the number of at least one processed images.

12. An image output apparatus as defined in claim 2, wherein the condition setting unit detects a number of the object regions having calculated attention levels greater than a set threshold value, and sets the detected number of object regions as the number of at least one processed images.

13. The image output apparatus according to claim 10, wherein said photography mode is one of a portrait mode, a landscape mode and a sports mode.

* * * * *

UNITED STATES PATENT AND TRADEMARK OFFICE
CERTIFICATE OF CORRECTION

| | | |
|---|---|---|
| PATENT NO. | : 8,203,772 B2 | Page 1 of 1 |
| APPLICATION NO. | : 11/730041 | |
| DATED | : June 19, 2012 | |
| INVENTOR(S) | : Hirokazu Kameyama et al. | |

It is certified that error appears in the above-identified patent and that said Letters Patent is hereby corrected as shown below:

ON THE TITLE PAGE:

Please insert the following as item (30):

-- (30)      Foreign Application Priority Data

Mar. 31, 2006    (JP) .......................................... 2006-099213 --.

Signed and Sealed this
Ninth Day of October, 2012

David J. Kappos
*Director of the United States Patent and Trademark Office*